(12) United States Patent
Tsuzuki

(10) Patent No.: US 10,580,589 B2
(45) Date of Patent: Mar. 3, 2020

(54) LITHIUM ION CAPACITOR

(71) Applicant: TAIYO YUDEN CO., LTD., Taito-ku, Tokyo (JP)

(72) Inventor: Takeo Tsuzuki, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 313 days.

(21) Appl. No.: 15/474,378

(22) Filed: Mar. 30, 2017

(65) Prior Publication Data

US 2017/0345582 A1 Nov. 30, 2017

(30) Foreign Application Priority Data

May 30, 2016 (JP) .................................. 2016-107991

(51) Int. Cl.
| | | |
|---|---|---|
| *H01G 11/06* | (2013.01) | |
| *H01G 11/60* | (2013.01) | |
| *C01B 21/086* | (2006.01) | |
| *H01G 11/62* | (2013.01) | |

(52) U.S. Cl.
CPC ........... *H01G 11/06* (2013.01); *C01B 21/086* (2013.01); *H01G 11/60* (2013.01); *H01G 11/62* (2013.01); *Y02E 60/13* (2013.01)

(58) Field of Classification Search
CPC ................................. H01G 11/06; H01G 11/60
See application file for complete search history.

(56) References Cited

U.S. PATENT DOCUMENTS

2015/0318578 A1* 11/2015 Abe ..................... H01G 11/06 429/332
2018/0277900 A1* 9/2018 Abe ..................... H01G 11/62

FOREIGN PATENT DOCUMENTS

| | | | |
|---|---|---|---|
| CN | 103384018 A | | 11/2013 |
| CN | 104638301 A | | 5/2015 |
| CN | 105551815 A | | 5/2016 |
| JP | 2013101900 A | | 5/2013 |
| JP | 2013225388 A | | 10/2013 |
| JP | 2015079636 A | | 4/2015 |
| JP | 6083459 | * | 2/2017 |
| KR | 20160030765 A | | 3/2016 |
| WO | WO 2017057588 | * | 4/2017 |

OTHER PUBLICATIONS

Translation for JP 6083459, Feb. 22, 2017.*
A First Office Action issued by the State Intellectual Property Office of China dated Aug. 23, 2018 for Chinese counterpart application No. 201710165590.7.
A Notification of Second Office Action issued by the State Intellectual Property Office of China dated Mar. 7, 2019 for Chinese counterpart application No. 201710165590.7. (4 pages).

* cited by examiner

*Primary Examiner* — C Melissa Koslow
(74) *Attorney, Agent, or Firm* — Law Offices of Katsuhiro Arai

(57) ABSTRACT

A lithium ion capacitor has an electrolytic solution that contains: 100 parts by volume of a solvent containing 20 to 50 parts by volume of propylene carbonate, 10 to 35 parts by volume of dimethyl carbonate, and 15 to 70 parts by volume of ethyl methyl carbonate; and lithium bis(fluorosulfonyl) imide, as an electrolyte. The lithium ion capacitor can maintain its initial high capacitance and low internal resistance, while also undergoing minimal characteristics changes in a low-temperature environment, even after exposure to a high-temperature, high-voltage environment.

2 Claims, 1 Drawing Sheet

LITHIUM ION CAPACITOR

BACKGROUND

Field of the Invention

The present invention relates to a lithium ion capacitor.

Description of the Related Art

Electrical double-layer capacitors using non-aqueous electrolytic solution offer high electrolytic decomposition voltage of solvent and therefore achieve high voltage resistance, and are able to store a large amount of energy as a result. In particular, lithium ion capacitors have greater capacitance per unit volume than electrical double-layer capacitors, and they also last longer than lithium ion secondary batteries when the discharge depth of their negative electrode is reduced or a polarizing positive electrode material is used. In recent years, there are calls for lithium ion capacitors that achieve lower internal resistance at low temperatures, while ensuring reliability in a high-temperature environment. In terms of characteristics, lithium ion capacitors are subject to rise in internal resistance at low temperatures due to reduced electrolyte dissociation in the electrolytic solution and rise in the viscosity of the electrolytic solution; at high temperatures, their reliability is affected probably due to deterioration in cell characteristics as a result of decomposition of $PF_6^-$ and other anions constituting the electrolyte and consequent generation of hydrogen fluoride and other decomposition products.

To solve the aforementioned problems, Patent Literature 1, for example, proposes a lithium ion battery that uses an electrolytic solution constituted by a mixture of lithium hexafluorophosphate ($LiPF_6$) and lithium bis(fluorosulfonyl)imide (LiFSI), being used as an electrolyte, and a mixed solvent of cyclic carbonate and chained carbonate, being used as a solvent for non-aqueous electrolytic solution. Patent Literature 2 proposes a lithium ion battery that uses an electrolytic solution whose electrolyte is LiFSI, and whose solvent for non-aqueous electrolytic solution is a mixed solvent of chained carbonic acid ester, cyclic carbonic acid ester, chained ester, and cyclic ether. Patent Literature 3 proposes a lithium ion battery that uses an electrolytic solution whose electrolyte is LiFSI, and whose solvent for non-aqueous electrolytic solution is a mixed solvent of cyclic carbonate and chained carbonate.

BACKGROUND ART LITERATURES

[Patent Literature 1] Japanese Patent Laid-open No. 2013-101900

[Patent Literature 2] Japanese Patent Laid-open No. 2013-225388

[Patent Literature 3] Japanese Patent Laid-open No. 2015-79636

SUMMARY

Just like the invention in Patent Literature 1, a system that uses a mixture of $LiPF_6$ and LiFSI not only achieves insufficient low-temperature characteristics, but if such system uses chained carbonate as a low-viscosity solvent to improve the low-temperature characteristics of the device, then $LiPF_6$ will decompose at high temperatures (such as 70° C.) and the high-temperature reliability of the device will be lost. Also, use of chained ester or cyclic ether as a low-viscosity solvent, as is the case with the invention in Patent Literature 2, will improve the low-temperature characteristics of the device; at high temperatures (such as 70° C.), however, the negative electrode will react with such solvent and the high-temperature reliability of the device will be lost. On the other hand, Patent Literature 3 states that the characteristics of a lithium ion secondary battery improves when a high-concentration electrolytic solution of LiFSI is used; however, the higher the concentration of the electrolytic solution, the lower the degree of ion dissociation becomes, which means that, in the case of a lithium ion capacitor, the internal resistance will rise significantly.

In light of the foregoing, an object of the present invention is to provide a lithium ion capacitor that maintains its initial high capacitance and low internal resistance, while also undergoing minimal characteristic changes in a low-temperature environment, even after exposure to a high-temperature, high-voltage environment.

Any discussion of problems and solutions involved in the related art has been included in this disclosure solely for the purposes of providing a context for the present invention, and should not be taken as an admission that any or all of the discussion were known at the time the invention was made.

After studying in earnest, the inventors of the present invention completed the present invention described below.

The lithium ion capacitor proposed by the present invention contains an electrolytic solution. The electrolytic solution contains: 100 parts by volume of a solvent containing 20 to 50 parts by volume of propylene carbonate, 10 to 35 parts by volume of dimethyl carbonate, and 15 to 70 parts by volume of ethyl methyl carbonate; and lithium bis(fluorosulfonyl)imide, as an electrolyte.

According to the present invention, a lithium ion capacitor whose initial high capacitance and low internal resistance are equal to what can be achieved by prior art, and which also undergoes minimal characteristic changes in a low-temperature environment, even after exposure to a high-temperature, high-voltage environment, is provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIGS. 1A, 1B, and 1C are schematic views of a lithium ion capacitor in an embodiment of the present invention wherein FIG. 1A is a perspective plan view, FIG. 1B is an exploded view, and FIG. 1C is a section view.

DESCRIPTION OF THE SYMBOLS

Figure 1A:
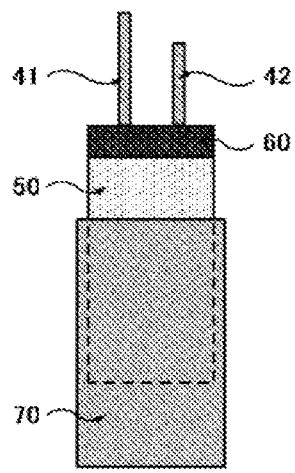

10—Positive electrode, 11—Positive-electrode collector, 12—Positive-electrode layer, 20—Negative electrode, 21—Negative-electrode collector, 22—Negative-electrode layer, 30—Separator, 41—Positive-electrode terminal, 42—Negative-electrode terminal, 50—Element, 60—Rubber seal, 70—Outer housing.

DETAILED DESCRIPTION OF EMBODIMENTS

The present invention is described in detail below by referring to the drawings as deemed appropriate. It should be noted, however, that the present invention is not limited to the embodiment illustrated in any way, and that, because characteristic parts of the invention may be emphasized in the drawings, the scale of each part in a given drawing may not be accurate.

Figure 1B:
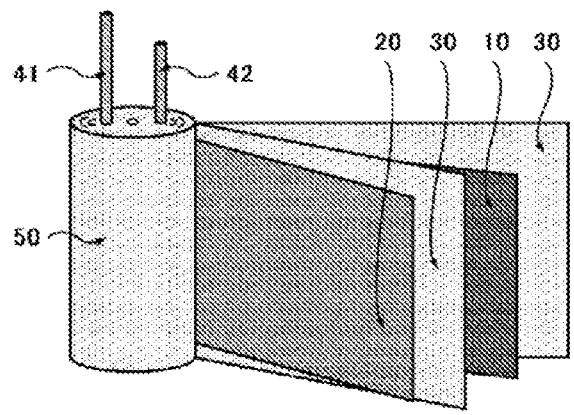
Figure 1C:
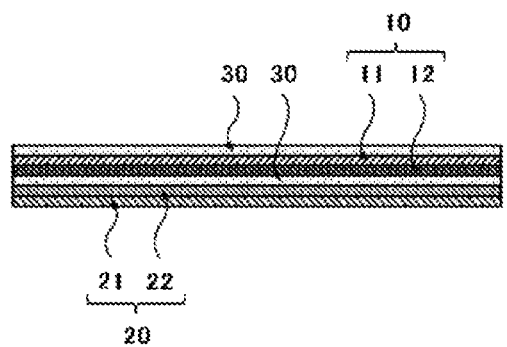

FIGS. 1A, 1B, and 1C provide schematic views of a lithium ion capacitor representing an example of an electrochemical capacitor. FIG. 1A is a perspective plan view, FIG. 1B is an exploded view, and FIG. 1C is a section view. The lithium ion capacitor has, for example, an electric storage element 50 that in turn has a positive electrode 10, a negative electrode 20, and separators 30 separating the positive electrode 10 and negative electrode 20, as well as an outer housing 70 that houses this electric storage element 50. Here, a pair of terminals 41, 42 are connected to the positive electrode 10 and the negative electrode 20, respectively. The terminals 41, 42 are extended to the outside via a rubber seal 60. An electrolytic solution which will be described later is sealed in the container 70, and impregnated into active materials 12, 22 of the positive electrode 10 and negative electrode 20, or into the separators 30. By caulking the rubber seal 60 at the outer housing 70, the air-tightness of the lithium ion capacitor is maintained.

FIG. 1C illustrates a structure where a positive-electrode layer 12 and a negative-electrode layer 22 are placed on one face of a positive-electrode collector 11 and on one face of a negative-electrode collector 21, respectively. Under the present invention, the electrode structure and the like are not limited in any way, and electrode layers may be placed on both faces of each current collector, for example. It should be noted that the lithium ion capacitor is not limited to the cylindrical type as illustrated, and it may be a multilayer type or coin type or have other forms. The shape of the element 50 is not limited in any way, either, and besides having the wound structure as illustrated, the element 50 may have a multilayer structure; while the outer housing 70 may be a square housing.

The separators 30 need only be constituted in a manner preventing multiple electrodes (typically a positive electrode and a negative electrode) from physically contacting each other, and how this contact prevention is embodied is not limited in any way.

Also, preferably the separators 30 are porous so that when the electrolytic solution is held in their pores, conductive paths between the electrodes are formed in a favorable manner. The separator 30 material is not limited in any way, and examples include, but are not limited to, cellulose, polypropylene, polyethylene, fluororesin, and other porous materials.

With the lithium ion capacitor of the mode shown in FIGS. 1A, 1B, and 1C, the positive-electrode layer 12 and negative-electrode layer 22 may be respectively formed on the surfaces of the positive-electrode collector 11 and negative-electrode collector 21, each made of a metal foil, via a conductive adhesive or conductive coat layer (not illustrated), if necessary.

For the metal foil used for obtaining each current collector, any sheet-shaped metal exhibiting conductivity can be used without limitation, but it is preferably made of aluminum, copper, or the like. The size, thickness, and other dimensions of the metal foil are not limited in any way, and prior art relating to electro-chemical capacitors can be referenced as deemed appropriate for these dimensions.

For the electrode layers 12, 22, any known structure used in the polarizing electrode layers of lithium ion capacitors may be used. Normally the electrode layers 12, 22 each contain an active material selected from polyaniline (PAN), polyacene semiconductor substance (PAS), active carbon, carbon black, graphite, carbon nanotube, etc., for example. The electrode layers 12, 22 may also each contain any conductive agent, binder, or other component used in the polarizing electrode layers of lithium ion capacitors, as necessary.

The present invention is characterized by the composition of its electrolytic solution.

Preferably the electrolytic solution in the lithium ion capacitor is a non-aqueous electrolytic solution and the electrolytic solution contains an organic solvent and an electrolyte.

Under the present invention, the electrolyte contains at least LiFSI. The concentration of LiFSI in the electrolytic solution is preferably in a range of 1.0 to 1.6 mol/L, because a concentration of 1.0 mol/L or higher leads to a particularly high initial capacitance, while a concentration of 1.6 mol/L or lower results in a particularly low rate of change in internal resistance at low temperatures. Preferably LiFSI accounts for a majority of the electrolyte; for example, LiFSI accounts for 90 percent by weight or more, or preferably 95 percent by weight or more, or more preferably all, except for unavoidable impurities, of the total quantity of electrolyte.

The electrolytic solution must contain, as its solvent, three types of compounds including propylene carbonate (PC), dimethyl carbonate (DMC), and ethyl methyl carbonate (EMC). In 100 parts by volume of the solvent, 20 to 50 parts by volume of PC, 10 to 35 parts by volume of DMC, and 15 to 70 parts by volume of EMC are contained. Preferably the aforementioned three types of compounds account for a majority of the solvent; for example, the three types of compounds account for 90 percent by volume or more, or preferably 95 percent by volume or more, or more preferably all, except for unavoidable impurities, of 100 parts by volume of the solvent. Thus, the solvent may comprise, consist essentially of, or consist of the three compounds, depending on the embodiment.

Under the present invention, an additive that would act upon the negative electrode and form a favorable film, such as vinylene carbonate (VC) or fluoroethylene carbonate (FEC), may be added to the electrolytic solution, as deemed appropriate, and to the extent that the effects of the present invention will not be adversely affected.

The present invention is not limited in any way, except for the constitution of the electrolytic solution, and prior art may be referenced as deemed appropriate for the shape, manufacturing method, etc., of the lithium ion capacitor. The constitution in the example below can also be referenced.

EXAMPLE

The present invention is explained in greater detail below using an example. It should be noted, however, that the present invention is not limited to the embodiment of the example.

[Manufacturing Method]

A slurry containing polyacene semiconductor substance (PAS) as an electrode active material, as well as carboxy methyl cellulose and styrene butadiene rubber as a binder, was prepared and this slurry was applied on an aluminum foil to obtain a positive electrode. A negative electrode was produced in sheet shape by preparing a slurry containing non-graphitizing carbon made of phenol resin material, as an active material, as well as carboxy methyl cellulose and styrene butadiene rubber as a binder, and then applying the slurry on a perforated copper foil. Cellulose separators were sandwiched between these electrodes, after which lead terminals were attached to current collectors by means of ultrasonic welding, and they were wound together into an element which was then secured with polyimide-based adhesive tape. A rubber seal was attached to the element thus produced, after which the element was vacuum-dried at approx. 180° C. and then a lithium foil was attached to the negative electrode, and the element was placed in a container. Thereafter, an electrolytic solution which will be described later was poured into the container, and then the rubber seal was caulked, to produce a lithium ion capacitor cell.

[Evaluation Method]

Each lithium capacitor thus obtained was measured for initial characteristics, or specifically the capacitance and internal resistance at room temperature. The capacitance was calculated from the slope of the discharge curve obtained by charging the lithium ion capacitor for 30 minutes at room temperature to 3.8 V at 500 mA using a charge/discharge tester (TOSCAT-3200 manufactured by Toyo System Co., Ltd.), and then discharging it to 2.2 V at 50 mA. The internal resistance was calculated from the voltage drop obtained by charging the lithium ion capacitor for 30 minutes at room temperature to 3.8 V at 140 mA using a charge/discharge tester (TOSCAT-3200 manufactured by Toyo System Co., Ltd.), and then discharging it to 2.2 V at 140 mA.

Thereafter, a low-temperature characteristics evaluation and float test were conducted. In the low-temperature characteristics evaluation, the lithium ion capacitor was left for 2 hours in a thermostatic chamber adjusted to −40° C., and then measured for capacitance and internal resistance. In the float test, the lithium ion capacitor was charged continuously for 1000 hours at a voltage of 3.8 V in a thermostatic chamber adjusted to 70° C., after which the cell was let cool to room temperature and then measured for capacitance and internal resistance. The capacitances and internal resistances after the low-temperature characteristics evaluation and float test were calculated as percentage values relative to the measured values of initial characteristics (100%).

The constitution of the electrolytic solution for the lithium ion capacitor associated with each manufacturing number is described below.

The manufacturing numbers with an asterisk (*) represent comparative examples.

The following acronyms are used to describe the solvents and electrolytes:

PC—Propylene carbonate
DMC—Dimethyl carbonate
EMC—Ethyl methyl carbonate
EC—Ethylene carbonate
MP—Methyl propionate The electrolyte concentrations are expressed in units of mol/L.

| Manufacturing No. | Solvent | [Volume ratios] | Electrolyte | Concentration |
| --- | --- | --- | --- | --- |
| *1 | PC/DMC/EMC | [60/40/0] | LiFSI | 1.2 |
| *2 | PC/DMC/EMC | [60/35/5] | LiFSI | 1.2 |
| *3 | PC/DMC/EMC | [50/40/10] | LiFSI | 1.2 |
| 4 | PC/DMC/EMC | [50/35/15] | LiFSI | 1.2 |
| *5 | PC/DMC/EMC | [40/40/20] | LiFSI | 1.2 |
| 6 | PC/DMC/EMC | [40/30/30] | LiFSI | 1.2 |
| *7 | PC/DMC/EMC | [30/40/30] | LiFSI | 1.2 |
| 8 | PC/DMC/EMC | [30/30/40] | LiFSI | 1.2 |
| *9 | PC/DMC/EMC | [20/40/40] | LiFSI | 1.2 |
| 10 | PC/DMC/EMC | [20/30/50] | LiFSI | 1.2 |
| *11 | PC/DMC/EMC | [10/40/50] | LiFSI | 1.2 |
| *12 | PC/DMC/EMC | [10/30/60] | LiFSI | 1.2 |
| 13 | PC/DMC/EMC | [30/20/50] | LiFSI | 1.2 |
| 14 | PC/DMC/EMC | [30/10/60] | LiFSI | 1.2 |
| *15 | PC/DMC/EMC | [30/5/65] | LiFSI | 1.2 |
| 16 | PC/DMC/EMC | [20/20/60] | LiFSI | 1.2 |
| 17 | PC/DMC/EMC | [20/10/70] | LiFSI | 1.2 |
| *18 | PC/DMC/EMC | [20/5/75] | LiFSI | 1.2 |
| 19 | PC/DMC/EMC | [30/30/40] | LiFSI | 1.0 |
| 20 | PC/DMC/EMC | [30/30/40] | LiFSI | 1.4 |
| 21 | PC/DMC/EMC | [30/30/40] | LiFSI | 1.6 |
| *22 | EC/EMC | [30/70] | $LiPF_6$/LiFSI [5/1] | 1.2 |
| *23 | EC/MP | [50/50] | LiFSI | 1.0 |
| *24 | EC/DMC | [10/90] | LiFSI | 2.0 |

The evaluation result of the lithium ion capacitor associated with each manufacturing number is described below.

The manufacturing numbers with an asterisk (*) represent comparative examples.

The symbols in the evaluation items have the following meanings:

C—Capacitance (initial characteristic) [F]

R—Internal resistance (initial characteristic) [mΩ]

−40C—Relative value of capacitance in the low-temperature characteristics evaluation (%)

−40R—Relative value of internal resistance in the low-temperature characteristics evaluation (%)

FC—Relative value of capacitance after the float test (%)

FR—Relative value of internal resistance after the float test (%)

It should be noted that the term "relative value" refers to a relative value (%) of each characteristic after the low-temperature characteristics evaluation or float test, with reference to the measured value of initial characteristics (100%) described above.

| Manufacturing No. | C | R | −40C | −40R | FC | FR |
| --- | --- | --- | --- | --- | --- | --- |
| *1 | 40 | 63 | 23 | 7770 | 88 | 112 |
| *2 | 40 | 63 | 38 | 5080 | 88 | 112 |
| *3 | 41 | 57 | 22 | 7850 | 87 | 114 |
| 4 | 40 | 58 | 43 | 4660 | 88 | 113 |
| *5 | 40 | 52 | 22 | 7920 | 87 | 114 |
| 6 | 41 | 54 | 47 | 4240 | 87 | 114 |
| *7 | 40 | 51 | 21 | 7970 | 88 | 114 |
| 8 | 41 | 52 | 53 | 3840 | 87 | 113 |
| *9 | 41 | 53 | 21 | 8060 | 87 | 116 |
| 10 | 40 | 55 | 51 | 4440 | 87 | 114 |
| *11 | 40 | 60 | 21 | 8230 | 86 | 116 |
| *12 | 40 | 62 | 48 | 5120 | 87 | 116 |
| 13 | 39 | 55 | 52 | 4370 | 88 | 113 |
| 14 | 40 | 58 | 50 | 4830 | 88 | 114 |
| *15 | 40 | 62 | 49 | 5020 | 87 | 114 |
| 16 | 40 | 57 | 50 | 4700 | 87 | 113 |
| 17 | 41 | 59 | 49 | 4980 | 87 | 114 |
| *18 | 40 | 63 | 48 | 5080 | 86 | 115 |
| 19 | 39 | 50 | 50 | 3640 | 85 | 118 |

-continued

| Manufacturing No. | C | R | −40C | −40R | FC | FR |
|---|---|---|---|---|---|---|
| 20 | 41 | 54 | 54 | 4250 | 88 | 112 |
| 21 | 42 | 58 | 56 | 4680 | 89 | 110 |
| *22 | 40 | 66 | 28 | 5660 | 86 | 114 |
| *23 | 40 | 58 | 22 | 7850 | 74 | 153 |
| *24 | 40 | 68 | Could not be measured. | Could not be measured. | 88 | 112 |

The above results are considered. The samples of manufacturing numbers 3 to 10, 13, 14, 16, 17, 19 to 21, and 23, showed good characteristics of less than 60 mΩ in internal resistance.

As for the low-temperature characteristics evaluation, the samples of manufacturing numbers 4, 6, 8, 10, 13, 14, 16, 17, and 19 to 21, showed good characteristics of 40% or more in rate of maintenance of capacitance at low temperature and less than 5000% in rate of change in internal resistance, given the low temperature of −40° C. As is evident from the samples of manufacturing numbers 1, 3, 5, 7, 9, 11, 23, and 24, on the other hand, presence of DMC and EC by a specified quantity or more caused these solvents to solidify at −40° C., and the rate of change in internal resistance rose significantly as a result. Particularly with the sample of manufacturing number 24, the solvent solidified significantly to the extent that internal resistance and capacitance could not be measured. Additionally, at −40° C., the rate of change in internal resistance tended to increase as the percentage of EMC in the chained carbonate increased, which suggests that use of an electrolytic solution that contains as much DMC as possible without solidifying is merited.

As for the rate of maintenance of capacitance and rate of change in internal resistance after the float test, all samples, except for the one of manufacturing number 23 that used MP as the solvent for electrolytic solution, generally showed good results.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-107991, filed May 30, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A lithium ion capacitor having an electrolytic solution that contains:
    a solvent containing 30 to 50 parts by volume of propylene carbonate, 10 to 35 parts by volume of dimethyl carbonate, and 15 to 70 parts by volume of ethyl methyl carbonate per 100 parts by volume of the solvent; and lithium bis(fluorosulfonyl)imide, as an electrolyte,
    wherein the solvent consists essentially of the three compounds consisting of propylene carbonate, dimethyl carbonate, and ethyl methyl carbonate in a manner that the three compounds account for 90 parts by volume or more, of the 100 parts by volume of the solvent to the extent that capacitance and internal resistance of the lithium ion capacitor are not materially affected,
    wherein the volume of ethyl methyl carbonate is 30% or more and 50% or less of a sum of the volume of dimethyl carbonate and the volume of ethyl methyl carbonate.

2. A lithium ion capacitor according to claim 1, wherein a concentration of lithium bis(fluorosulfonyl)imide in the electrolytic solution is in a range of 1.0 to 1.6 mol/L.

* * * * *